United States Patent
Gou et al.

(10) Patent No.: US 8,422,418 B2
(45) Date of Patent: Apr. 16, 2013

(54) EARTHQUAKE AND TSUNAMI WARNING SYSTEM AND A TRANSMISSION METHOD FOR A PRIMARY NOTIFICATION MESSAGE THEREOF

(75) Inventors: Wei Gou, Shenzhen (CN); Bin Wang, Shenzhen (CN); Feng Bi, Shenzhen (CN); Zijiang Ma, Shenzhen (CN); Ming Yuan, Shenzhen (CN); Xiaojiang Han, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 282 days.

(21) Appl. No.: 13/056,089

(22) PCT Filed: Jun. 24, 2009

(86) PCT No.: PCT/CN2009/072430
§ 371 (c)(1),
(2), (4) Date: Jan. 26, 2011

(87) PCT Pub. No.: WO2010/012182
PCT Pub. Date: Feb. 4, 2010

(65) Prior Publication Data
US 2011/0128904 A1 Jun. 2, 2011

(30) Foreign Application Priority Data

Jul. 30, 2008 (CN) .......................... 2008 1 0135123

(51) Int. Cl.
*H04W 4/12* (2009.01)
*H04W 4/22* (2009.01)
(52) U.S. Cl.
USPC ........ 370/312; 370/310; 370/328; 455/404.1; 455/412.1; 455/90.1
(58) Field of Classification Search .................. 370/310, 370/312, 328, 474, 476; 455/90.1, 404.1, 455/412.1; 705/7.13, 7.29; 709/223
See application file for complete search history.

(56) References Cited

U.S. PATENT DOCUMENTS

| | | | |
|---|---|---|---|
| 2005/0037728 A1* | 2/2005 | Binzel et al. | 455/404.1 |
| 2009/0055229 A1* | 2/2009 | Lidgren et al. | 705/7 |

(Continued)

FOREIGN PATENT DOCUMENTS

| | | |
|---|---|---|
| CN | 101043733 | 9/2007 |
| CN | 101060713 | 10/2007 |

(Continued)

OTHER PUBLICATIONS

International Search Report for International Application No. PCT/CN2009/072430, mailed Oct. 1, 2009.

(Continued)

*Primary Examiner* — Afsar M Qureshi
(74) *Attorney, Agent, or Firm* — Hunton & Williams, LLP

(57) ABSTRACT

The present disclosure provides an earthquake and tsunami warning system and a transmission method for a primary notification message thereof. The transmission method includes: a base station pages all terminals via a paging message containing indication information of an earthquake and tsunami warning system (ETWS) message, and transmits security information of an ETWS primary notification message via the resource prearranged with the terminals, and basic information of the ETWS primary notification message is transmitted within the paging message or via the prearranged resource; the terminals receive the security information of the ETWS primary notification message via the prearranged resource after receiving the paging message containing indication information of the ETWS message, and obtains the basic information of the ETWS primary notification message from the paging message or receives the basic information of the ETWS primary notification message via the prearranged resource. The technical solution provided by the present disclosure can achieve the transmission of the ETWS primary notification message as well as meet the time delay requirement, and modify the base station and terminals slightly with little or no overhead increasing.

26 Claims, 4 Drawing Sheets

U.S. PATENT DOCUMENTS

2009/0239498 A1* 9/2009 Lee et al. .................. 455/404.1
2009/0253401 A1* 10/2009 Lee et al. .................. 455/404.1
2010/0183031 A1* 7/2010 Dalsgaard et al. ............ 370/474

FOREIGN PATENT DOCUMENTS

| JP | 2002344381 A | 11/2002 |
|---|---|---|
| JP | 2006005843 A | 1/2006 |
| JP | 2006135398 A | 5/2006 |
| JP | 2007156766 A | 6/2007 |
| WO | 2006/107250 | 10/2006 |

OTHER PUBLICATIONS

Written Opinion for International Application No. PCT/CN2009/072430, mailed Oct. 1, 2009.

* cited by examiner

-- PRIOR ART --

Fig. 2   -- PRIOR ART --

EARTHQUAKE AND TSUNAMI WARNING SYSTEM AND A TRANSMISSION METHOD FOR A PRIMARY NOTIFICATION MESSAGE THEREOF

CROSS-REFERENCE TO RELATED APPLICATIONS

This patent application is a U.S. national phase application of International Patent Application No. PCT/CN2009/072430, filed Jun. 24, 2009, which claims priority to China Patent Application No. 200810135123.0, filed Jul. 30, 2008, each of which is hereby incorporated by reference herein in its entirety.

TECHNICAL FIELD

The present disclosure relates to an earthquake and tsunami warning system (ETWS) and a transmission method for a primary notification message thereof.

BACKGROUND

In order to actively cope with the natural disasters, such as an earthquake and a tsunami, it is necessary to establish an earthquake and tsunami warning system, hereinafter referred to as ETWS. With this system, it is able to promptly transmit information related to the disasters to subscribers when a natural disaster such as an earthquake or a tsunami happens, so that the influences of such disasters on human can be reduced.

FIG. 1 shows a network architecture diagram of a public land mobile network (PLMN) operator providing earthquake and tsunami warning services to subscribers via the ETWS. When a disaster event is imminent or has taken place, the government or other organizations issue a warning notification to the PLMN operator which transmits warning notification messages to subscribers via the ETWS included in the frame of FIG. 1.

Depending on different urgency and purpose, the warning notification message may be classified into two types: the first type of notification message is called primary notification message containing the most important disaster information (for example, earthquake or tsunami being imminent), wherein the primary notification messages are to be transmitted to subscribers via the system within 4 s; and the second type of notification message is called secondary notification message containing auxiliary information related to the disasters (for example, where to get the assistance), wherein the secondary notification messages are to be transmitted to subscribers via the system within 10 s to 30 s. The primary notification message consists of two parts, i.e. basic information and security information, wherein the basic information contains contents of warning type, warning area and the like, and the basic information is 5 bytes long; and the security information is used for providing a digital signature and a time stamp to the basic information, and the security information is about 50 bytes long.

In a long term evolution (LTE) system, the ETWS framework suggested by the prior art is shown in FIG. 2. The ETWS is implemented by adopting a CBC (cell broadcast centre) core network, and the network framework and interfaces of the ETWS are shown in FIG. 2, including an evolved universal terrestrial radio access network (E-UTRAN), a mobility management entity (MME), a serving gateway (S-GW), a packet data network gateway (P-GW), a home subscriber server (HSS), a policy and charging rules function (PCRF) entity and other support nodes. Based on the network architecture, when a base station (also called evolved node B, i.e. eNB) in the E-UTRAN transmits an ETWS primary notification message to a terminal (also called user equipment, i.e. UE) via an air interface Uu, the time delay requirement being within 4 s for transmitting the primary notification message cannot be met if taking the manner of paging the UE first and then transmitting the ETWS primary notification message to the terminal in the next system message modification period in a system message (usually 5 s later).

SUMMARY

The present disclosure aims to provide a transmission method for an earthquake and tsunami warning system primary notification message and a corresponding earthquake and tsunami warning system, capable of meeting the time requirement for transmitting the primary notification message in the earthquake and tsunami warning system.

To achieve the objective above, the present disclosure provides a transmission method for an earthquake and tsunami warning system (ETWS) primary notification message, including that:

a base station pages all terminals via a paging message containing ETWS message indication information and transmits security information of an ETWS primary notification message via a resource prearranged with the terminals, wherein basic information of the ETWS primary notification message is transmitted within the paging message or via the prearranged resource; and the terminals receive the security information of the ETWS primary notification message via the prearranged resource after receiving the paging message containing the indication information of an ETWS message and obtain the basic information of the ETWS primary notification message from the paging message or receive the basic information of the ETWS primary notification message via the prearranged resource.

The prearranged resource may be located on a downlink shared channel (DL-SCH) within one or more sub-frames, and the sub-frame(s) containing the prearranged resource may be one or more sub-frames in a sub-frame set which may contain the sub-frame where the paging message is located and the following first to fifth sub-frames.

The ETWS message indication information may be a specific international mobile subscriber identification (IMSI) for indicating the ETWS primary notification message to be transmitted.

The ETWS message indication information may further be a flag set in the paging message, which is as the Indication information of the ETWS message, for indicating the ETWS primary notification message to be transmitted.

The prearranged resource may be a certain existing fixed channel resource of the system (for example, paging channel, i.e. PCH), or a certain system information block (SIB) in a system message or certain system information (SI) including the system message.

The prearranged resource (hereinafter referred to as resource S) may be continuous; the base station and the terminals may have arranged a fixed position for the resource S on the DL-SCH, and the terminals may directly determine the position of the resource S on the DL-SCH according to the fixed position; or the base station and the terminals may have arranged a fixed relative position relation between the resource S and the other resource with a known position on the DL-SCH, and the terminals may deduce the position of the resource S on the DL-SCH according to the position of the other resource.

The prearranged resource (hereinafter referred to as resource S) may also be discrete; with regard to a part resource in the resource S, the base station and the terminals may have arranged a fixed position for the part resource on the DL-SCH, and the terminals may directly determine the position of the part resource on the DL-SCH according to the fixed position; or the base station and the terminals may have arranged a fixed relative position relation between the part resource and the other resource with a known position on the DL-SCH, and the terminals may deduce the position of the part resource on the DL-SCH according to the position of the other resource.

The other resource may be a paging channel (PCH) resource.

The transmission method for primary notification messages of the ETWS may be used in an LTE system, and the prearranged resource is used for transmitting the security information or the security information together with the basic information of the ETWS primary notification message when earthquake or tsunami happens, or the prearranged resource is used for other services in case of no earthquake nor tsunami.

The present disclosure further provides an earthquake and tsunami warning system, including:

a base station which pages all terminals via a paging message containing indication information of an earthquake and tsunami warning system (ETWS) message, and transmits security information of an ETWS primary notification message via a resource prearranged with the terminals, and transmits basic information of the ETWS primary notification message within the paging message or via the prearranged resource; and the terminals which receive the security information of the ETWS primary notification message via the prearranged resource after receiving the paging message containing the Indication information of the ETWS message, and obtain the basic information of the ETWS primary notification message from the paging message or receive the basic information of the ETWS primary notification message via the prearranged resource.

The resource prearranged by the base station and the terminals may be located on a downlink shared channel (DL-SCH) within one or more sub-frames, and the sub-frame(s) containing the prearranged resource may be one or more sub-frames in a sub-frame set which may contain the sub-frame where the paging message is located and the following first to fifth sub-frames.

The resource prearranged by the base station and the terminals (hereinafter referred to as resource 9) may be continuous; the base station and the terminals may have arranged a fixed position for the resource S on the DL-SCH, and the terminals may directly determine the position of the resource S on the DL-SCH according to the fixed position; or the base station and the terminals may have arranged a fixed relative position relation between the resource S and the other resource with a known position on the DL-SCH, and the terminals may deduce the position of the resource S on the DL-SCH according to the position of the other resource.

The resource prearranged by the base station and the terminals (hereinafter referred to as resource S) may also be discrete; with regard to a part resource in the resource S, the base station and the terminals may have arranged a fixed position for the part resource on the DL-SCH, and the terminals may directly determine the position of the part resource on the DL-SCH according to the fixed position; or the base station and the terminals may have arranged a fixed relative position relation between the part resource and the other resource with a known position on the DL-SCH, and the terminals may deduce the position of the part resource on the DL-SCH according to the position of the other resource.

DETAILED DESCRIPTION

Figure 1:
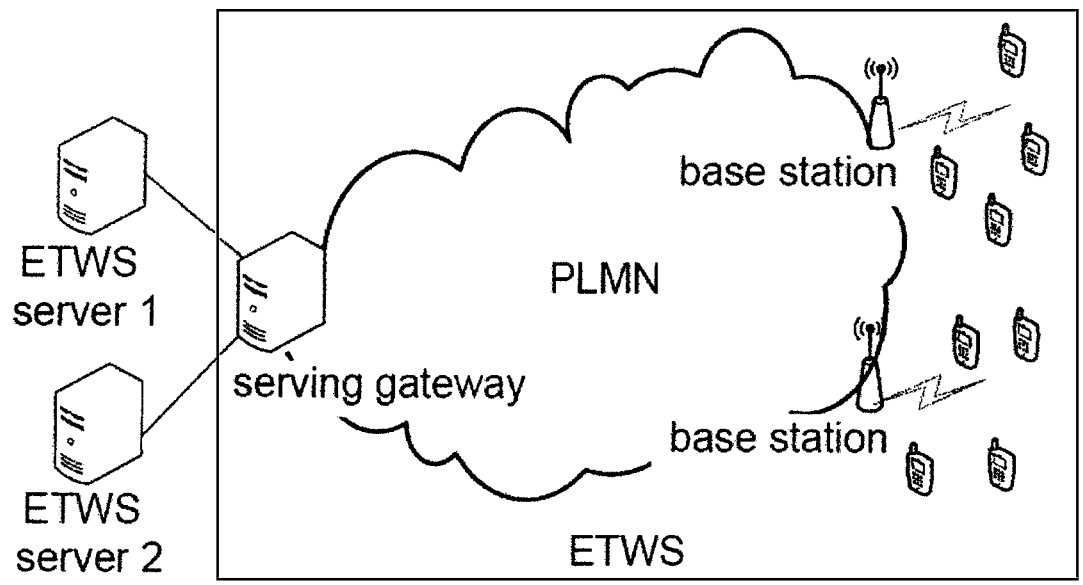
FIG. 1 shows a system framework diagram of an ETWS.
Figure 2:
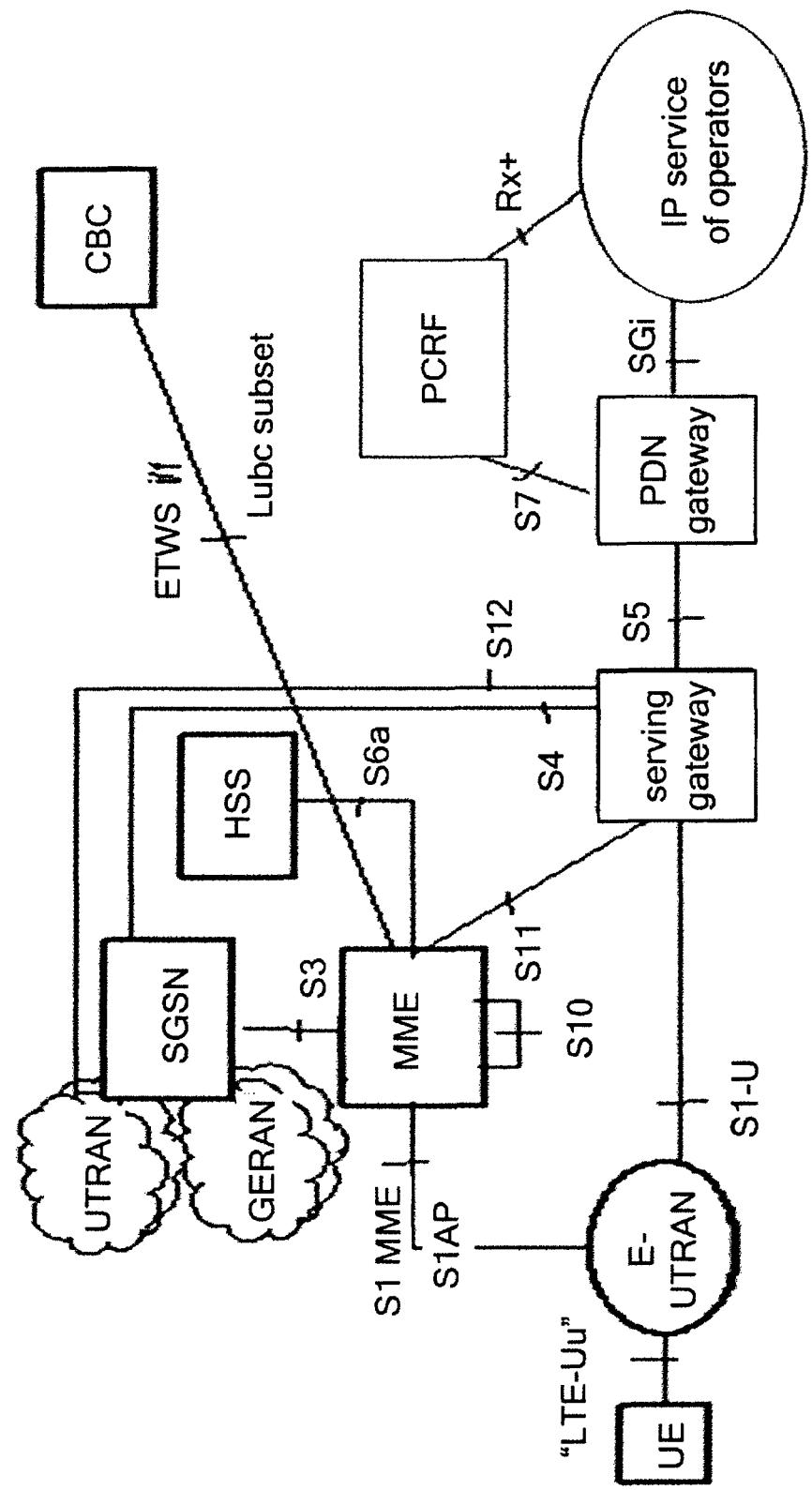
FIG. 2 shows a schematic diagram of a network framework and interfaces of the ETWS in an LTE system.

In order to meet the time delay requirement of an ETWS primary notification message, for example, a paging message is directly used to include basic information and security information of a primary notification message, but the content of the primary notification message is of a large size, resulting in the problems of segmentation of the primary notification message and modification of the current paging message structure and the like problems, so that the system is modified quite a lot. Therefore, the present disclosure notifies the terminals of the basic information of the primary notification message via the paging message and notifies the terminals of the security information of the primary notification message via the prearranged resource on the DL-SCH, or notifies the terminals of all information of the primary notification message via the prearranged resource on the DL-SCH combining with the corresponding scheduling methods, to meet the time delay requirement as well as reduce the modification of the message.

Taking the application of the present disclosure in an LTE system as an example, the following explains the embodiments of the present disclosure in detail in conjunction with the accompanying drawings.

First Embodiment

The processing procedure of the embodiment method at a base station side is that: the base station transmits a paging message including an ETWS message indication to terminals and immediately transmits an ETWS primary notification message including basic information and security information via a prearranged resource on a DL-SCH. The terminals receive the paging message including the ETWS message indication, and then receive the ETWS primary notification message via the prearranged resource.

In this embodiment, to make all terminals capable of receiving the ETWS primary notification message without a resource allocation instruction notification after receiving the paging message including the ETWS message indication, the base station and the terminals need to prearrange a resource for transmitting the ETWS primary notification message, so that the signalling overhead is reduced.

The prearranged resource S (for simplicity, the prearranged resource is referred to as S) may be a certain existing fixed channel resource, a certain existing message or a certain existing carrier and the like in the system, in a word, it is the existing channel, message or carrier in the system already known by the terminals. For example, the resource S may be a paging channel (PCH), thus, the terminals can directly receive the ETWS primary notification message (including the basic information and the security information) on the next PCH after receiving the ETWS message indication information; the resource S may also be a certain system information block in a system message, so that the terminals can directly receive via an arranged resource S to obtain the ETWS primary notification message after receiving the Indication information of the ETWS message; and the resource S may further be certain system information, such as SI3, and the ETWS primary notification message may be formed into a message (SI3 message) included in the SI3, so that the terminals can directly receive the message via the SI3 to obtain the ETWS primary notification message after receiving the Indication information of the ETWS message.

In this embodiment, the prearranged resource S is used for bearing the basic information and the security information of the ETWS primary notification message and may be located on a DL-SCH within one or more sub-frames, and the sub-frame(s) containing the prearranged resource S is/are one or more sub-frames in a sub-frame set which preferably contains the sub-frame where the paging message is located and the following first to fifth sub-frames. In the two embodiments of the document, the resource S is allocated on the DL-SCH within the sub-frame transmitting the paging message or the next sub-frame.

Also, it is required to arrange the position of the resource S on the DL-SCH, and the easier implementations are as follows:

1) Directly arrange a fixed position for the resource S on the DL-SCH, provided two methods:

i) the size of the ETWS information is known, and the code rate, modulation means and the like are fixed, so the resource S with suitable size may be directly allocated on the DL-SCH within the sub-frame. For example, the tenth to fifteenth physical resource blocks (PRBs) within the sub-frame are prescribed to be the resource S (provided that 6 PRBs can hold the ETWS primary notification message), or the tenth, twelfth, and fourteenth to sixteenth PRBs are prescribed to be the resource S. In a word, the resource for the security information is reserved in the premise of no influence on the system information resource and paging message resource. The reserved resource may be used for other purposes in case of no earthquake and preferably used for the security information in case of earthquake. Of course, in this case, the paging channel, i.e. PCH, shall perform the transmission on an earlier PRB, and there is a certain time interval between the PCH resource and resource S, which shall be greater than the time for the terminals to process the paging.

ii) the size of the ETWS information is known, and the code rate, modulation means and the like are fixed, so the resource S with suitable size may be allocated on the DL-SCH within the sub-frame next to or close to the sub-frame where the paging message is located. For example, the tenth to fifteenth PRBs within the sub-frame next to or close to the sub-frame where the paging message is located are prescribed to be the resource S (provided that 6 PRBs can hold the ETWS primary notification message), or the tenth, twelfth, and fourteenth to sixteenth PRBs therein are prescribed to be the resource S.

2) Arrange a fixed relative position relation between the resource S and the other resource with a known position on the DL-SCH, so that the position of the resource S on the DL-SCH can be deduced according to the position of the other resource;

The other resource, for example, may be a PCH. Because the PCH is changed dynamically, and the system will notify the terminals of the position of the PCH resource each time, a fixed relative position relation between the resource S and the PCH resource may be arranged. For example, it is arranged that the resource S is several continuous PRBs next to the PCH resource, and if the PRBs are insufficient to bear the security information, the PRBs can extend to the first PRB of the next sub-frame.

The resource S may be continuous or discrete wherein "discrete" means that the resource S is divided into multiple parts, but the position of each part must be fixed or is capable of being deduced. For example, the resource S may consist of resource S1 and resource S2 with an interval between which in frequency resource and/or time resource, for example, the resource S1 is on the fourth OFDM symbol and the resource S2 is on the sixth OFDM symbol. The positions of resource S1 and resource S2 on the DL-SCH can be arranged to be fixed; or the fixed position of only one of them, e.g. S1, on the DL-SCH is arranged, and a fixed relative position relation between resource S2 and resource S1 (or other resource) with the fixed position is arranged as well, so that the position of resource S2 is deduced. The resource S may further be divided into resource S1, resource S2 and resource S3 or more parts with the positions arranged by the similar method. That is, for a certain part resource of the resource S, either the fixed position of the part resource on the DL-SCH is prearranged, or the fixed relative position relation between the part resource and the other resource with a known position on the DL-SCH is arranged.

In the document, the position of the resource S refers to the position of the whole resource S on the DL-SCH, which may be represented by an initial position and an end position in time domain and frequency domain or, by an initial position or an end position plus the number of the resource in time domain and frequency domain.

The prearranged resource is used for transmitting the security information or the security information together with the basic information of the ETWS primary notification message when the earthquake or tsunami happens, or the prearranged resource may be used for other services in case of no earthquake nor tsunami.

Figure 3:
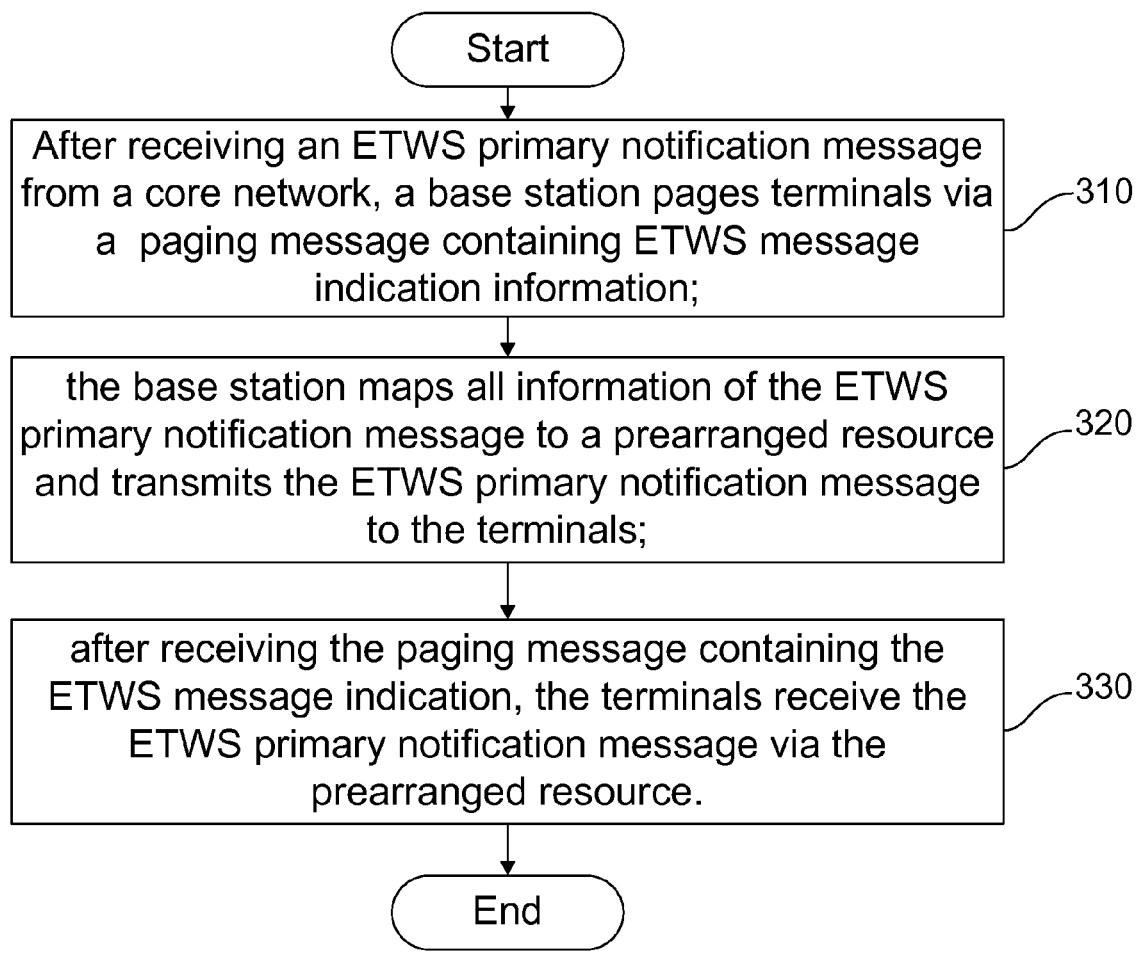
FIG. 3 shows a flowchart of a first embodiment method of the present disclosure.

The flow of the embodiment method is shown in FIG. 3, including the following steps:

Step 310, a base station pages terminals via a paging message containing Indication information of the ETWS message after receiving an ETWS primary notification message from a core network.

The embodiment takes a specific international mobile subscriber identification (IMSI), i.e. ETWS IMSI, as the ETWS message indication information to notify the terminals of the ETWS primary notification message to be transmitted. But this is not the only method, in other embodiments, it is also feasible to set a flag in the paging message for indicating an ETWS primary notification message to be transmitted, and the like, as the ETWS message indication information.

Step 320, the base station maps all information of the ETWS primary notification message to a prearranged resource and transmits the ETWS primary notification message to the terminals;

Step 330, the terminals receive the paging message including the ETWS message indication and then receive the ETWS primary notification message via the prearranged resource.

The terminals confirm the reception of the paging message including the ETWS message indication when the terminals determine the IMSI in the received paging message being the ETWS IMSI.

Second Embodiment

In this embodiment, a base station transmits a paging message which includes an ETWS message indication and basic information of an ETWS primary notification message to terminals and transmits security information of the ETWS primary notification message via a prearranged resource S on a DL-SCH. The resource S used for transmitting the security information may be prearranged according to the method disclosed in the first embodiment.

Figure 4:
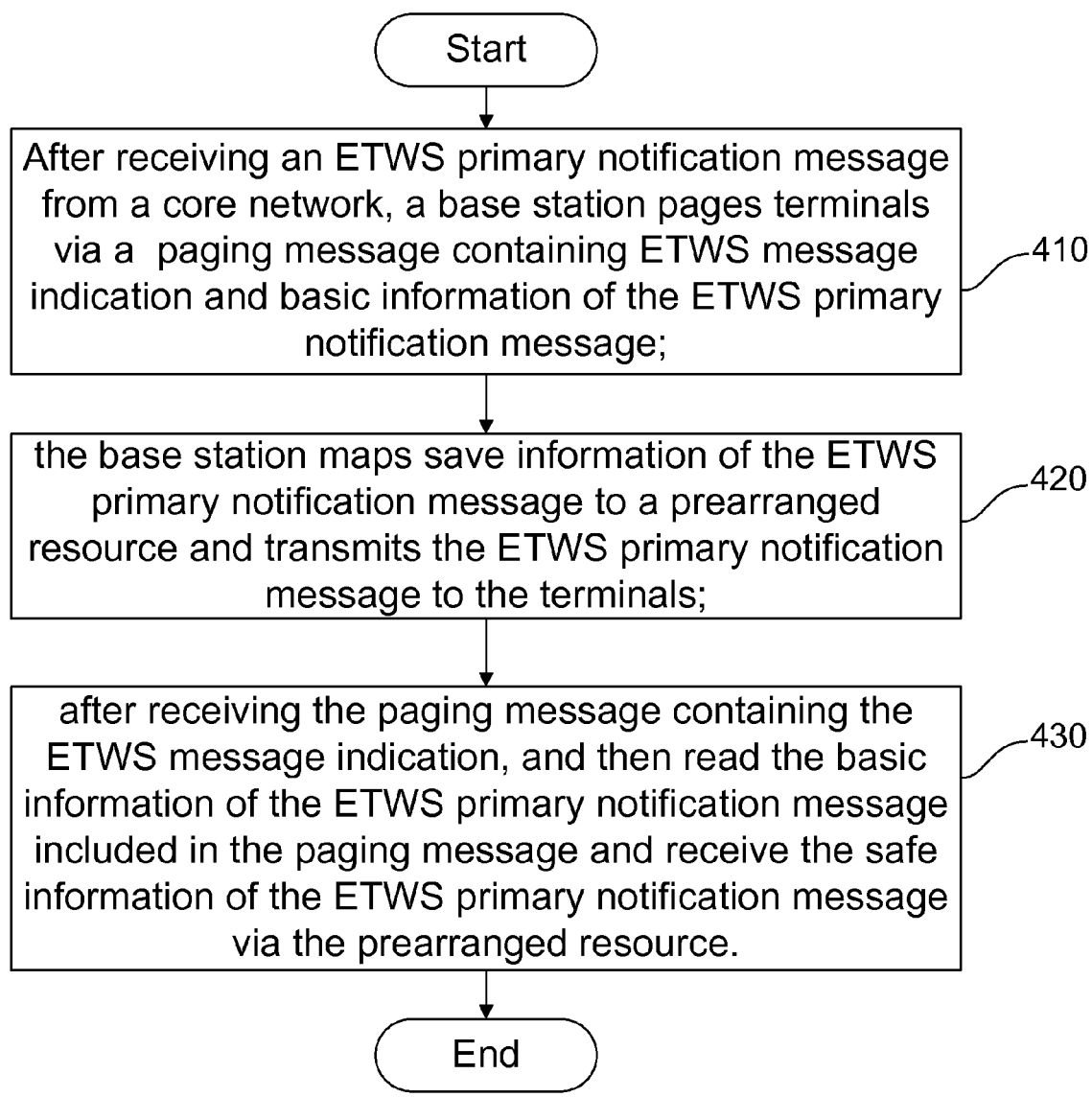
FIG. 4 shows a flowchart of a second embodiment method of the present disclosure.

The processing flow of the embodiment at a base station side is shown in FIG. 4, including the following steps:

Step 410, a base station pages terminals with a paging message including an ETWS message indication and basic information of an ETWS primary notification message after receiving the ETWS primary notification message from a core network.

The embodiment may also use an ETWS IMSI as the ETWS message indication, and the basic information of the ETWS primary notification message may be stored in an information unit of the paging message and be read by the terminals.

Step 420, the base station maps security information of the ETWS primary notification message to a prearranged resource and transmits the security information to the terminals.

Step 430, the terminals receive the paging message including the ETWS message indication and then read the basic information of the ETWS primary notification message included in the paging message and receive the security information of the ETWS primary notification message via the prearranged resource.

The two embodiments above both transmit the ETWS primary notification message or the security information thereof via the prearranged resource S, however, for the present disclosure, the base station may also transmit a resource allocation instruction to the terminals to indicate the position of the resource bearing the ETWS primary notification message or the security information thereof while transmitting the paging message. The terminals can correctly receive the ETWS primary notification message or the security information thereof according to the resource allocation instruction.

The following explains two application examples of the present disclosure.

First Application Example

In this example, the security information of an ETWS primary notification message is borne on a prearranged resource S, provided that the prearranged resource S is the next sub-frame of a sub-frame where a paging message including ETWS indication information is located, and occupies the tenth to fifteenth PRBs of a DL-SCH. The resource S is capable for bearing the security information of the ETWS primary notification message.

The process of transmitting the ETWS primary notification message from a base station to terminals includes that: the base station receives the ETWS primary notification message from a core network; the base station initiates a paging to the terminals at the paging time of the terminals, wherein the IMSI of the paging message is an ETWS IMSI and the paging message includes basic information of the ETWS primary notification message; the base station maps security information of the ETWS primary notification message to the prearranged resource S and transmits the security information to the terminals within the next sub-frame of the sub-frame where the paging message is located.

The processing process of receiving the ETWS primary notification message at the terminal side includes that: the terminals receive the paging message at the paging time thereof, determine that the paging is an ETWS paging when the IMSI of the received paging message is an ETWS IMSI, read the basic information of the ETWS primary notification message included in the paging message; the terminals receive the security information of the ETWS primary notification message on the tenth to fifteen PRBs of the next sub-frame.

Second Application Example

In this example, security information of an ETWS primary notification message is borne on a prearranged resource S, the position of which is within a sub-frame for transmitting a paging message including an ETWS indication, and the resource S has a fixed relative position relation with the paging channel, provided that the resource S is on the following continuous 6 PRBs next to the paging channel resource. For the PRBs with sequence index exceeding the maximum index number, the PRBs are allocated within the next sub-frame, and the index number resulting from modular operation on the PRB sequence index number is used as the actual PRB sequence index number.

The process of transmitting the ETWS primary notification message from a base station to terminals includes that: the base station receives the ETWS primary notification message from a core network; the base station initiates a paging to the terminals at the paging time of the terminals, wherein the IMSI of the paging message is an ETWS IMSI and the paging message includes basic information of the ETWS primary notification message; the base station maps the security information of the ETWS primary notification message to the prearranged resource S and transmits the security information to the terminals within the same sub-frame as the sub-frame where the paging message is located.

The processing process of receiving the ETWS primary notification message at the terminal side includes that: the terminals receive the paging message at the paging time thereof, determine that the paging is an ETWS paging when the IMSI of the received paging message is an ETWS IMSI, read the basic information of the ETWS primary notification message included in the paging message; the terminals receive the security information of the ETWS primary notification message on the following continuous 6 PRBs next to paging channel resource.

The maximum time delay of paging a terminal is 2.56 s without considering that a paging message from a base station is not received by the terminals caused by the air interface quality, etc. With this solution, the terminals receive the paging message and then start immediately to read the security information of the ETWS primary notification message on the prearranged resource, the time delay between which can be prescribed less than 2 ms. Therefore, the time for the ETWS primary notification message reaching the terminals does not exceed 4 s, generally.

In present disclosure, the transmission method of the ETWS primary notification messages may also be used for an ETWS in a communication system.

INDUSTRIAL APPLICABILITY

Compared with the prior art, the technical solution provided by the present disclosure can achieve the transmission of the ETWS primary notification message as well as meet the time delay requirement being within 4 s, and just little modify the base station and the terminals with little or no overhead increasing.

The invention claimed is:

1. A transmission method for an earthquake and tsunami warning system (ETWS) primary notification messages, comprising:
   a base station paging all terminals via a paging message containing indication information of an ETWS message and, immediately transmitting security information and basic information of the ETWS primary notification message via a resource which is prearranged on a downlink shared channel (DL-SCH) with the terminals; or, transmitting the basic information of the ETWS primary notification message within the paging message, and transmitting the security information of the ETWS primary notification message via the prearranged resource on the DL-SCH; and
   the terminals receiving the security information and basic information of the ETWS primary notification message via the prearranged resource on the DL-SCH after receiving the paging message containing the ETWS message indication information; or, obtaining the basic information of the ETWS primary notification message from the paging message and receiving the security information of the ETWS primary notification message via the prearranged resource on the DL-SCH.

2. The transmission method according to claim 1, wherein the prearranged resource is located on a downlink shared channel (DL-SCH) within one or more sub-frames, and the sub-frame(s) containing the prearranged resource is/are one or more sub-frames in a sub-frame set which contains the sub-frame where the paging message is located and the following first to fifth sub-frames.

3. The transmission method according to claim 1, wherein the Indication information of the ETWS message is a flag set in the paging message, which is as the Indication information of the ETWS message, for indicating the ETWS primary notification message to be transmitted.

4. The transmission method according to claim 3, wherein the prearranged resource is a certain existing fixed channel resource of the system, a certain system information block in a system message or certain system information including the system message.

5. The transmission method according to claim 4, wherein the existing fixed channel resource of the system is a paging channel.

6. The transmission method according to claim 3, wherein the prearranged resource is continuous; the base station and the terminals have arranged a fixed position for the prearranged resource on the DL-SCH, and the terminals directly determine the position of the prearranged resource on the DL-SCH according to the fixed position; or the base station and the terminals have arranged a fixed relative position relation between the prearranged resource and the other resource with a known position on the DL-SCH, and the terminals deduce the position of the prearranged resource on the DL-SCH according to the position of the other resource.

7. The transmission method according to claim 3, wherein the prearranged resource is discrete; with regard to a part resource in the prearranged resource, the base station and the terminals have arranged a fixed position for the part resource on the DL-SCH, and the terminals directly determine the position of the part resource on the DL-SCH according to the fixed position; or the base station and the terminals have arranged a fixed relative position relation between the part resource and the other resource with a known position on the DL-SCH, and the terminals deduce the position of the part resource on the DL-SCH according to the position of the other resource.

8. The transmission method according to claim 7, wherein the other resource is a paging channel resource.

9. The transmission method according to claim 1, wherein the method is used in an LTE system, and the prearranged resource is used for transmitting the security information or the security information together with the basic information of the ETWS primary notification message when earthquake or tsunami happens, or the prearranged resource is used for other services in case of no earthquake nor tsunami.

10. An earthquake and tsunami warning system, comprising:
    a base station, used for paging all terminals via a paging message containing indication information of an earthquake and tsunami warning system (ETWS) message and, immediately transmitting security information and basic information of an ETWS primary notification message via a resource which is prearranged on a downlink shared channel (DL-SCH) with the terminals; or, transmitting the basic information of the ETWS primary notification message within the paging message, and transmitting the security information of the ETWS primary notification message via the prearranged resource on the DL-SCH; and
    the terminals, used for receiving the security information and basic information of the ETWS primary notification message via the prearranged resource on the DL-SCH after receiving the paging message containing the indication information of the ETWS message; or, obtaining the basic information of the ETWS primary notification message from the paging message and receiving the security information of the ETWS primary notification message via the prearranged resource on the DL-SCH.

11. The earthquake and tsunami warning system according to claim 10, wherein the prearranged resource is located on a downlink shared channel (DL-SCH) within one or more sub-frames, and the sub-frame(s) containing the prearranged resource is/are one or more sub-frames in a sub-frame set which contains the sub-frame where the paging message is located and the following first to fifth sub-frames.

12. The earthquake and tsunami warning system according to claim 11, wherein the prearranged resource is continuous; the base station and the terminals have arranged a fixed position for the prearranged resource on the DL-SCH, and the terminals directly determine the position of the prearranged resource on the DL-SCH according to the fixed position; or the base station and the terminals have arranged a fixed relative position relation between the prearranged resource and the other resource with a known position on the DL-SCH, and the terminals deduce the position of the prearranged resource on the DL-SCH according to the position of the other resource.

13. The earthquake and tsunami warning system according to claim 11, wherein the prearranged resource is discrete; with regard to a part resource in the prearranged resource, the base station and the terminals have arranged a fixed position for the part resource on the DL-SCH, and the terminals directly determine the position of the part resource on the DL-SCH according to the fixed position; or the base station and the terminals have arranged a fixed relative position relation between the part resource and the other resource with a known position on the DL-SCH, and the terminals deduce the position of the part resource on the DL-SCH according to the position of the other resource.

14. The transmission method according to claim 2, wherein the Indication information of the ETWS message is a flag set in the paging message, which is as the Indication information of the ETWS message, for indicating the ETWS primary notification message to be transmitted.

15. The transmission method according to claim 10, wherein the prearranged resource is a certain existing fixed channel resource of the system, or a certain system information block in a system message or certain system information including the system message.

16. The transmission method according to claim 1, wherein the prearranged resource is a certain existing fixed channel resource of the system, a certain system information block in a system message or certain system information including the system message.

17. The transmission method according to claim 15, wherein the existing fixed channel resource of the system is a paging channel.

18. The transmission method according to claim 16, wherein the existing fixed channel resource of the system is a paging channel.

19. The transmission method according to claim 14, wherein the prearranged resource is continuous; the base station and the terminals have arranged a fixed position for the prearranged resource on the DL-SCH, and the terminals directly determine the position of the prearranged resource on the DL-SCH according to the fixed position; or the base station and the terminals have arranged a fixed relative position relation between the prearranged resource and the other resource with a known position on the DL-SCH, and the terminals deduce the position of the prearranged resource on the DL-SCH according to the position of the other resource.

20. The transmission method according to claim 1, wherein the prearranged resource is continuous; the base station and the terminals have arranged a fixed position for the prearranged resource on the DL-SCH, and the terminals directly determine the position of the prearranged resource on the DL-SCH according to the fixed position; or the base station and the terminals have arranged a fixed relative position relation between the prearranged resource and the other resource with a known position on the DL-SCH, and the terminals deduce the position of the prearranged resource on the DL-SCH according to the position of the other resource.

21. The transmission method according to claim 14, wherein the prearranged resource is discrete; with regard to a part resource in the prearranged resource, the base station and the terminals have arranged a fixed position for the part resource on the DL-SCH, and the terminals directly determine the position of the part resource on the DL-SCH according to the fixed position; or the base station and the terminals have arranged a fixed relative position relation between the part resource and the other resource with a known position on the DL-SCH, and the terminals deduce the position of the part resource on the DL-SCH according to the position of the other resource.

22. The transmission method according to claim 1, wherein the prearranged resource is discrete; with regard to a part resource in the prearranged resource, the base station and the terminals have arranged a fixed position for the part resource on the DL-SCH, and the terminals directly determine the position of the part resource on the DL-SCH according to the fixed position; or the base station and the terminals have arranged a fixed relative position relation between the part resource and the other resource with a known position on the DL-SCH, and the terminals deduce the position of the part resource on the DL-SCH according to the position of the other resource.

23. The transmission method according to claim 21, wherein the other resource is a paging channel resource.

24. The transmission method according to claim 22, wherein the other resource is a paging channel resource.

25. The earthquake and tsunami warning system according to claim 10, wherein the prearranged resource is continuous; the base station and the terminals have arranged a fixed position for the prearranged resource on the DL-SCH, and the terminals directly determine the position of the prearranged resource on the DL-SCH according to the fixed position; or the base station and the terminals have arranged a fixed relative position relation between the prearranged resource and the other resource with a known position on the DL-SCH, and the terminals deduce the position of the prearranged resource on the DL-SCH according to the position of the other resource.

26. The earthquake and tsunami warning system according to claim 10, wherein the prearranged resource is discrete; with regard to a part resource in the prearranged resource, the base station and the terminals have arranged a fixed position for the part resource on the DL-SCH, and the terminals directly determine the position of the part resource on the DL-SCH according to the fixed position; or the base station and the terminals have arranged a fixed relative position relation between the part resource and the other resource with a known position on the DL-SCH, and the terminals deduce the position of the part resource on the DL-SCH according to the position of the other resource.

* * * * *

UNITED STATES PATENT AND TRADEMARK OFFICE
CERTIFICATE OF CORRECTION

PATENT NO. : 8,422,418 B2  Page 1 of 1
APPLICATION NO. : 13/056089
DATED : April 16, 2013
INVENTOR(S) : Gou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 281 days.

Signed and Sealed this
Eighth Day of September, 2015

Michelle K. Lee
*Director of the United States Patent and Trademark Office*